(12) United States Patent
Janssen et al.

(10) Patent No.: US 8,320,221 B2
(45) Date of Patent: Nov. 27, 2012

(54) CONTROLLING OPTICAL DISC

(75) Inventors: Matthew J. Janssen, Corvallis, OR (US); Timothy Wagner, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/003,748

(22) PCT Filed: Jul. 13, 2008

(86) PCT No.: PCT/US2008/069903
§ 371 (c)(1),
(2), (4) Date: Jan. 11, 2011

(87) PCT Pub. No.: WO2010/008372
PCT Pub. Date: Jan. 21, 2010

(65) Prior Publication Data
US 2011/0110203 A1    May 12, 2011

(51) Int. Cl.
*G11B 7/00* (2006.01)

(52) U.S. Cl. .................. 369/33.01; 369/47.38

(58) Field of Classification Search ............... 369/33.01, 369/47.38
See application file for complete search history.

(56) References Cited

U.S. PATENT DOCUMENTS

| | | | |
|---|---|---|---|
| 5,248,940 A | 9/1993 | Patience et al. | |
| RE35,469 E * | 3/1997 | Ueki | 318/400.34 |
| 6,222,336 B1 | 4/2001 | McKenzie et al. | |
| 7,026,773 B2 | 4/2006 | Petersen | |
| 7,196,715 B2 * | 3/2007 | Hanks | 347/224 |
| 7,688,534 B1 * | 3/2010 | McCornack | 360/31 |
| 2003/0108708 A1 | 6/2003 | Anderson et al. | |

FOREIGN PATENT DOCUMENTS
WO  PCT/US2007/085478    5/2009
* cited by examiner

*Primary Examiner* — Latanya Bibbins (57) ABSTRACT

An optical disc is rotated using a spindle motor of an optical disc device, at no more than 600 revolutions per minute (RPM). The spindle motor has at least three coil groups, where each coil group has one or more coils. While the optical disc is rotating, at least one of the coil groups generates a back electromagnetic force (EMF) signal. The back EMF signal is used to determine marking positions on the optical disc. An optical beam is used to mark the optical disc at the determined marking positions.

15 Claims, 10 Drawing Sheets

CONTROLLING OPTICAL DISC

BACKGROUND

Some types of optical discs permit end users to optically write data on optically writable data surfaces of the optical discs. For example, users may be able to store data on the optical discs for later retrieval. Such data may include computer files, images, music, and other types of data. However, historically, users have had to label the optical discs using markers, which yields unprofessional results, or affix labels to the label sides of the optical discs, which can be laborious.

More recently, users have been able to form images directly on the label sides of optical discs, using optical discs that have optically writable label surfaces. The users employ optical disc devices that are able to optically write to such label surfaces of optical discs. For example, the previously filed patent application entitled "Integrated CD/DVD Recording and Label", filed on Oct. 11, 2001, assigned Ser. No. 09/976,877, and published as US published patent application no. 2003/0108708, describes an optical disc having such an optically writable label surface.

Some types of optical discs having optically writable label surfaces have preformed or pre-imaged encoder spokes on areas of the optical discs. While such an optical disc is being rotated, the encoder spokes are detected so that the relative angular position of the optical disc currently incident to an optical mechanism that forms an image on the optically writable label surface of the optical disc is known. Employing encoder spokes to positionally control an optical disc while optically writing to the optically writable label surface of the optical disc can be disadvantageous, however.

The encoder spokes may not be able to be detected properly, due to the encoder spokes improperly interacting with other aspects of the optical discs. In some cases, forming the encoder spokes on optical discs raises the manufacturing costs of these optical discs. Detecting the encoder spokes can also require optical disc devices to have encoders and other hardware just for this purpose, raising their manufacturing costs as well. The encoder spokes further occupy relatively scarce space on optical discs that could otherwise be used for other purposes.

DETAILED DESCRIPTION OF THE DRAWINGS

Figure 1:
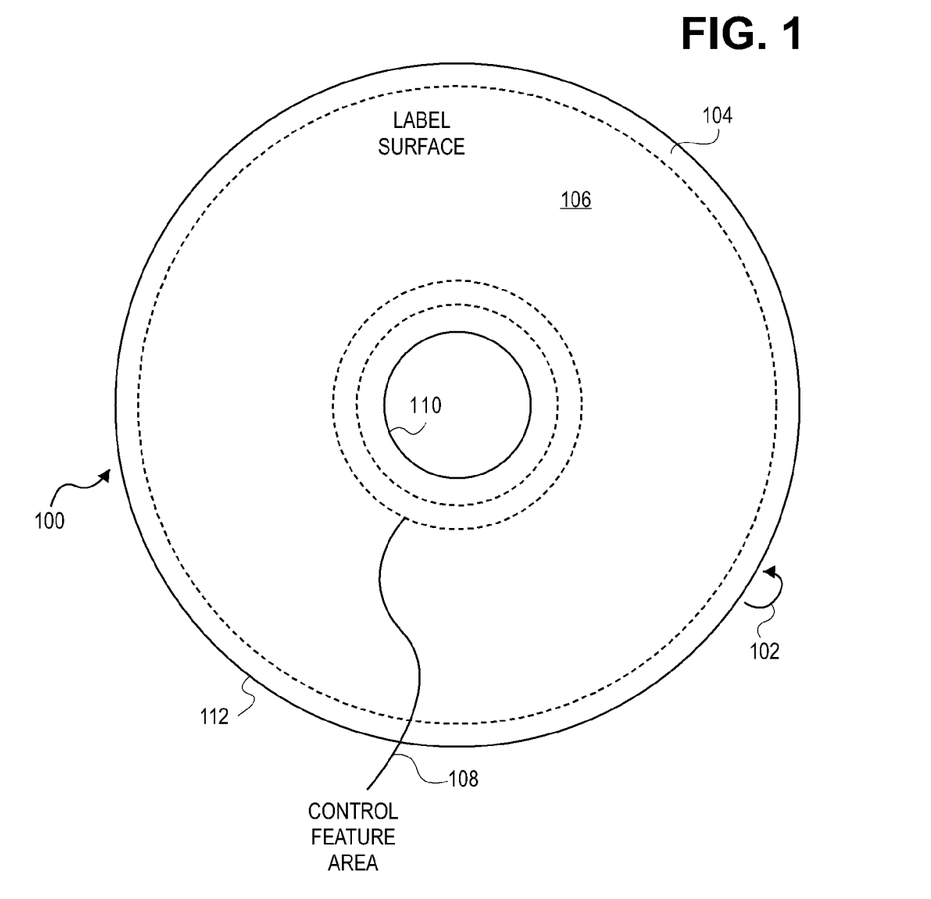
FIG. 1 is a diagram of an optical disc having an optically writable label surface and a control feature area, according to an embodiment of the present disclosure.

FIG. 1 shows an optical disc 100, in relation to which embodiments of the present disclosure can be practiced. The optical disc 100 includes an optically writable data side 102, which is the side that is not shown in FIG. 1, and an optically writable label side 104, which is the side that is shown in FIG. 1. The optical disc 100 includes an inside edge 110 and an outside edge 112. The optically writable label side 104 includes an optically writable label surface 106 and can also include a control feature area 108, the latter being close to the inside edge 110 in the embodiment of FIG. 1.

The optically writable data side 102 of the optical disc 100 includes a data region on which data may be optically written to and/or optically read by the optical disc device. The data side 102 is thus the side of the optical disc 100 to which binary data readable by the optical disc device and understandable by a computing device is written, and can be written by the optical disc device itself. For instance, the data side 102 may be the data side of a compact disc (CD), a CD-readable (CD-R), which can be optically written to once, a CD-readable/writable (CD-RW), which can be optically written to multiple times, and so on.

The data side 102 may further be the data side of a digital versatile disc (DVD), a DVD-recordable (DVD-R or DVD+R), a DVD that is recordable and writable (DVD-RW or DVD+RW), a DVD-RAM, or a dual-layer recordable DVD, among other types of optical discs. The data side 102 may also be the data side of a high-capacity optical disc, such as a Blu-ray optical disc, a High Definition HD-DVD optical disc, and so on.

The label side 104 is the side of the optical disc 100 to which visible markings can be optically written on the optically writable label surface area 106 thereof to realize a desired label image. For instance, the label side 104 may be part of an optical disc that is described in the previously filed patent application published as US published patent application no. 2003/0108708, which describes an optically writable label side of an optical disc. It is noted that in other embodiments at least one of the sides 102 and 104 of the optical disc 100 may have both label regions and data regions.

The control feature area 108 when present can include features that describe the optically writable label surface 106 of the optical disc 100, and/or that are used during image formation on the label surface 106 to properly form a desired image on the label surface 106. The control feature area 108 may thus include features to calibrate an optical mechanism of the optical disc device in which the optical disc 100 has been inserted, for optimal image formation on the label surface 106. The control feature area 108 may include a media identification pattern indicating the type of the label surface 106, information regarding which is then used for optimal image formation on the label surface 106. The control feature area 108 may further include encoder spokes as well as other features. However, embodiments of the present disclosure eliminate the need for such actual, physical encoder spokes being present within the control feature area 108. That is, while embodiments of the present disclosure eliminate the need for such actual, physical encoder spokes being present, embodiments of the present disclosure do not preclude using optical discs that nevertheless have actual, physical encoder spokes.

Figure 2:
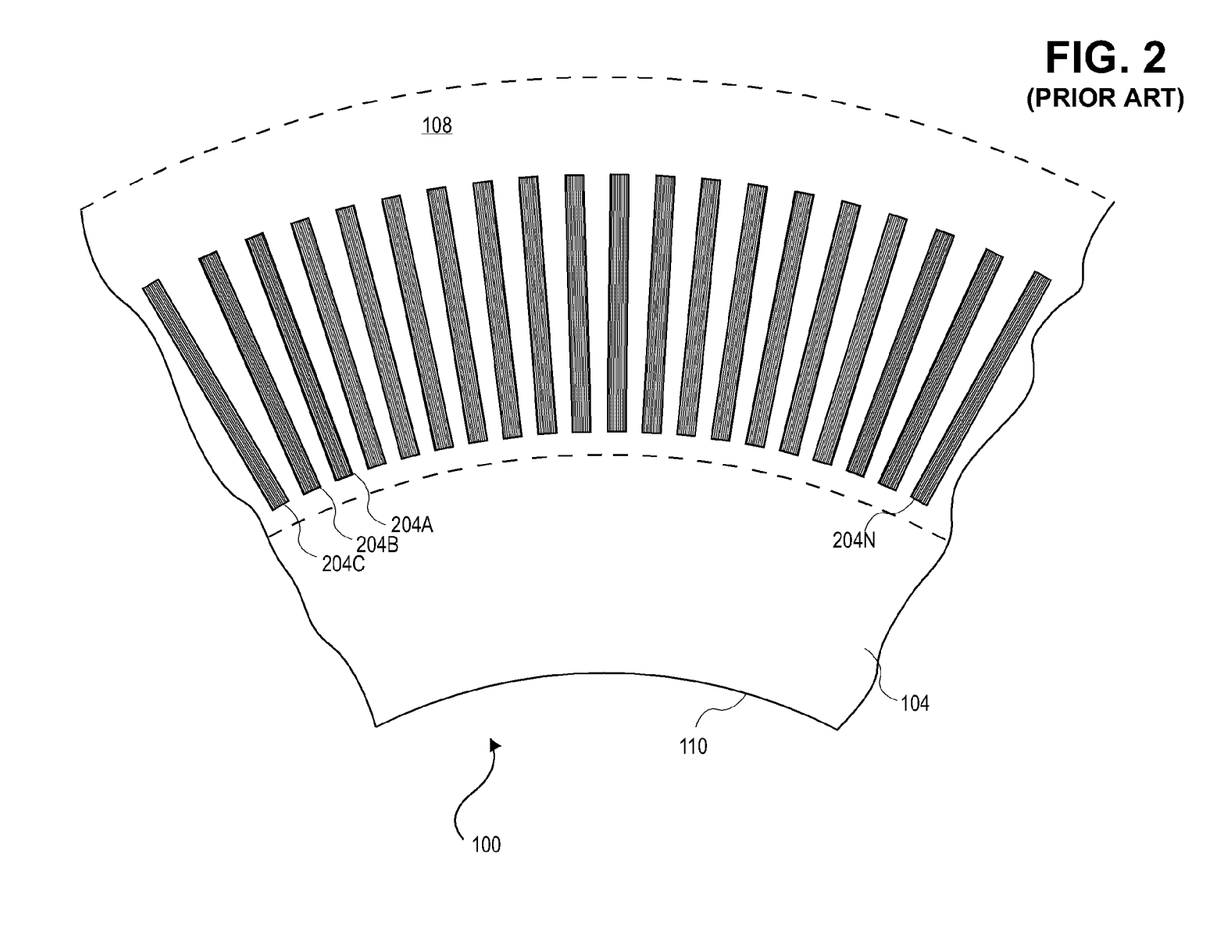
FIG. 2 is a diagram of the control feature area of an optical disc in detail, according to the prior art.

FIG. 2 shows a portion of the control feature area 108 of the label side 104 of the optical disc 100 in detail, according to the prior art. The control feature area 108 is depicted in FIG. 2 as including a number of encoder spokes 204A, 204B, 204C, . . . , 204N, collectively referred to as the encoder spokes 204. The control feature area 108 may include other features, in addition to and/or in lieu of the encoder spokes 204, such as index marks, calibration features, media identification patterns, and so on, as can be appreciated by those of ordinary skill within the art.

The encoder spokes 204 are actual, physical equally spaced rectangular marks around the circumference of the control feature area 108 viewable from the label side 104 of the optical disc 100. For instance, there may be 400 of such encoder spokes 204. The encoder spokes 204 are ordinarily and normally detected by an encoder of the optical disc device that may be permanently positioned incident to the control feature area 108, while the optical disc 100 is being rotated within an optical disc device. By detecting and counting the encoder spokes 204, the optical disc device is able to positionally control the optical disc 100. Positional control can mean that, for instance, the angular position and/or the angular speed of the optical disc as it rotates is controlled. As such, the current angular position of the optical disc 100 is known, so that an image is properly formed on the optically writable label surface 106 on the label side 104 of the optical disc 100.

However, as has been described in the background section, using actual, physical encoder spokes 204 to detect the current angular position of the optical disc 100 can be disadvantageous. Therefore, embodiments of the present disclosure instead generate virtual spoke signals that correspond to these encoder spokes 204 that would otherwise have to be present on the optical disc 100 to positionally control the optical disc 100 as the optical disc 100 rotates. That is, embodiments of the present disclosure eliminate the need for the actual, physical encoder spokes 204 having to be present on the optical disc 100 while still being able to positionally control the optical disc 100 as the optical disc 100 is rotated.

Figure 3:
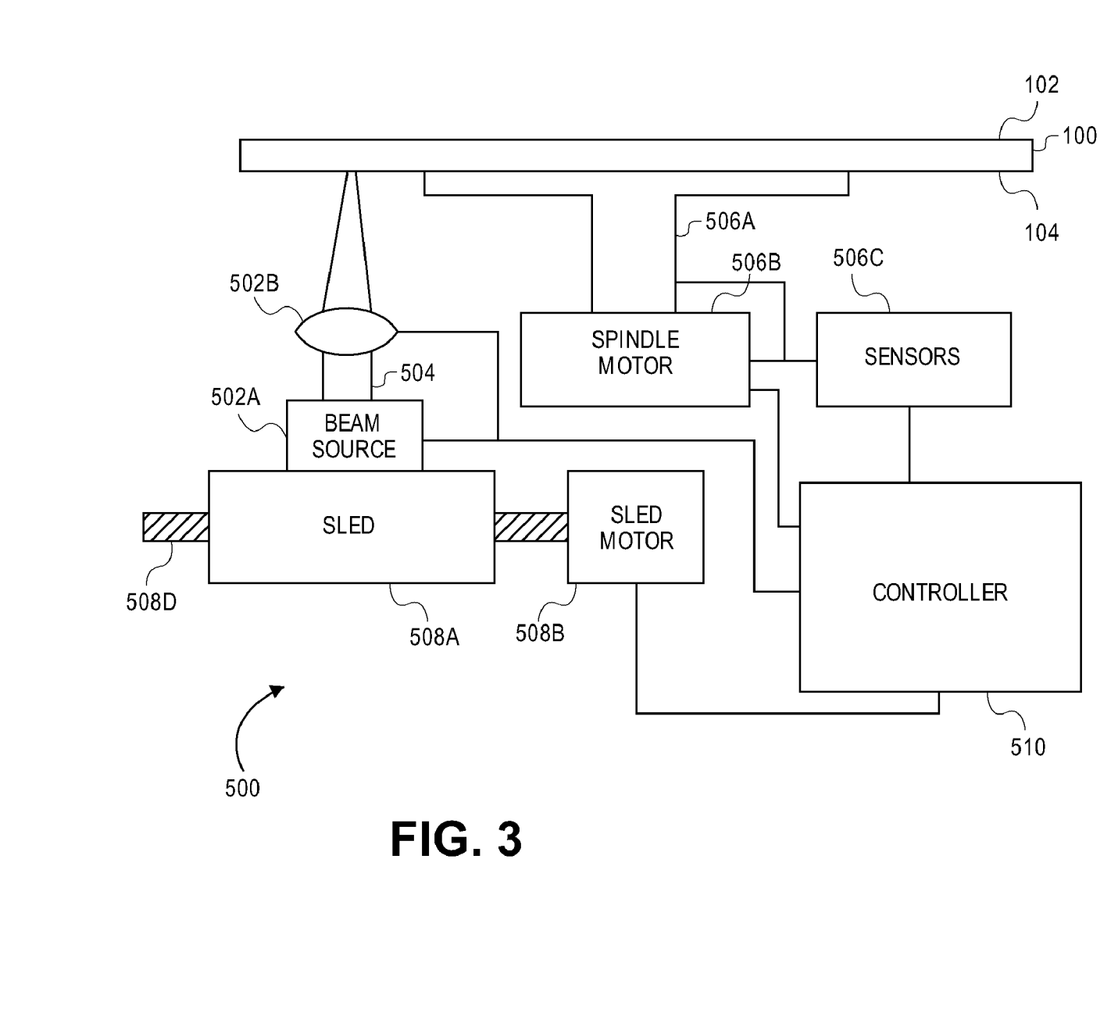
FIG. 3 is a front view diagram of an optical disc device, according to an embodiment of the present disclosure.

FIG. 3 shows a block view of an optical disc device 500, according to an embodiment of the present disclosure. The optical disc device 500 is for reading from and/or writing to the optical disc 100 inserted into the optical disc device 500 and that has been described. The optical disc device 500 includes a beam source 502A and an objective lens 502B, which are collectively referred to as the optical mechanism 502. For exemplary purposes only, the optically writable label side 104 of the optical disc 100 is depicted as being incident to the optical mechanism 502 in FIG. 3, such that the optical disc device 500 is or is about to optically write an image to the label side 104.

The optical disc device 500 also includes a spindle rotor 506A, a spindle motor 506B, and one or more sensors 506C, which are collectively referred to as the first motor mechanism 506. It is noted that in at least some embodiments, the optical disc device 500 includes an encoder, such as an optical encoder, to specifically detect the encoder spokes 204 on the control feature area 108, and thus to specifically determine the current angular position of the optical disc 100 as incident to the optical mechanism 502. Such an encoder, for instance, may include an optical emitter/optical receiver pair to detect the encoder spokes.

Rather, in these embodiments, the sensors 506C are used to specially determine the current angular position of the optical disc 100, and thus can be used to positionally control the optical disc 100. The sensors 506C may be Hall effect sensors, for instance, or alternatively the sensors 506C may be voltage sensors for detecting spindle motor back electromagnetic (EMF) signals, as can be appreciated by those of ordinary skill within the art. The sensors 506C are ordinarily and normally disposed within the optical disc device 500 to control the optical disc 100 as the optical disc rotates at speed no less than 800 revolutions per minute (RPM).

That is, where the optical disc device 500 is capable of just optically writing to and/or reading from the optically writable data side 102 of the optical disc 100—and not necessarily, for instance, to and from the optically writable label side 104 of the optical disc 100—the optical disc device 500 normally and ordinarily includes the sensors 506C to provide feedback to positionally control the optical disc 100 as it rotates at speeds no less than 800 RPM for current optical disc devices and likely for future optical disc devices as well. However, these sensors 506C do not have enough precision to provide feedback to positionally control the optical disc 100 as it rotates at speeds no greater than 600 RPM, as can be required to optically write to the optically writable label side 104 of the optical disc 100. Stated another way, in other words, the sensors 506C are present within ordinary optical disc devices to positionally control the optical disc 100 as the optical disc 100 rotates at high speeds, which are defined herein as being no less than 800 RPM, and typically as high as 10,000 RPM, which corresponds to the speed at which a 52× optical disc device rotates the optical disc 100.

As such, within the prior art, to also positionally control the optical disc 100 as the optical disc 100 rotates at low speeds, which are defined herein as being no greater than 600 RPM, and typically as low as 40 RPM, optical or other types of encoders are needed, and the encoder spokes 204 have to be present on the optical disc 100. Embodiments of the present disclosure thus eliminate the need for such dedicated optical encoders to be added to optical disc devices to positionally control the optical disc 100 at low speeds. As such, embodiments of the present disclosure eliminate the need for actual, physical encoder spokes being present within the optical disc 100.

The device 500 further includes a sled 508A, a sled motor 508B, and a rail 508D, which are collectively referred to as the second motor mechanism 508. As controlled by the controller 510, this motor mechanism 508 is that which permits positioning control of the sled 508A, and thus the optical mechanism 502, and therefore is that which determines the current radial position of the optical mechanism 502 incident to the optical disc 100. In some embodiments of the present disclosure, one or more additional components may be included, such as specifically a linear encoder to provide feedback for positioning control.

The optical mechanism 502 focuses an optical beam 504 on the optical disc 100. Specifically, the beam source 502A generates the optical beam 504, which is focused through the objective lens 502B onto the optical disc 100. The first motor mechanism 506 rotates the optical disc 100. Specifically, the optical disc 100 is situated on the spindle rotor 506A, which is rotated, or moved, by the spindle motor 506B and is positionally controlled based on signals detected by the sensors 506C communicatively coupled to the spindle motor 506B.

The second motor mechanism 508 moves the optical mechanism 502 radially relative to the optical disc 100. Specifically, the optical mechanism 502 is situated on the sled 508A, which is moved on the rail 508D by the sled motor 508B to a given position specified by controller 510. To positionally control the second motor mechanism 508, the controller 510 may employ a linear encoder, other hardware, software, or a combination of hardware and software.

The optical disc device 500 further includes a controller 510. The controller 510 selects positions on the optical disc 100 at which the optical beam 504 is to be focused for optically writing to and/or optically reading from such positions, by controlling the optical mechanism 502 as well as the first motor mechanism 506 and the second motor mechanism 508. The controller 510 is able to control the beam 504 generated by the beam source 502A, the focusing of the beam 504 through the objective lens 502B, the spindle motor mechanism 506B, and the sled motor 508B. The controller 510 may include hardware, software, or a combination of hardware and software. In one embodiment, the controller 510 may be or include firmware, as can be appreciated by those of ordinary skill within the art.

The controller 510 specifically positionally controls the optical disc 100 as the optical disc rotates at no more than 600 RPM (i.e., at low speeds) to permit the optical mechanism 502 to form a desired human-readable or other image on the optically writable label surface 106 of the optical disc 100. The controller 510 positionally controls the optical disc 100 at these low speeds based on virtual spoke signals. The controller 510 generates the virtual spoke signals, as is described in more detail later in the detailed description.

These virtual spoke signals correspond to actual, physical spokes 204 that would otherwise have to be present on the optical disc 100 for the controller 510 to positionally control the optical disc 100 at speeds no greater than 600 RPM. However, the virtual spoke signals are virtual in that they do not correspond to actual, physical spokes 204 being detected. Rather, the virtual spoke signals are virtual in that they correspond to actual, physical spokes 204 that would otherwise have to be detected but for the generation of the virtual spoke signals.

Figure 4:
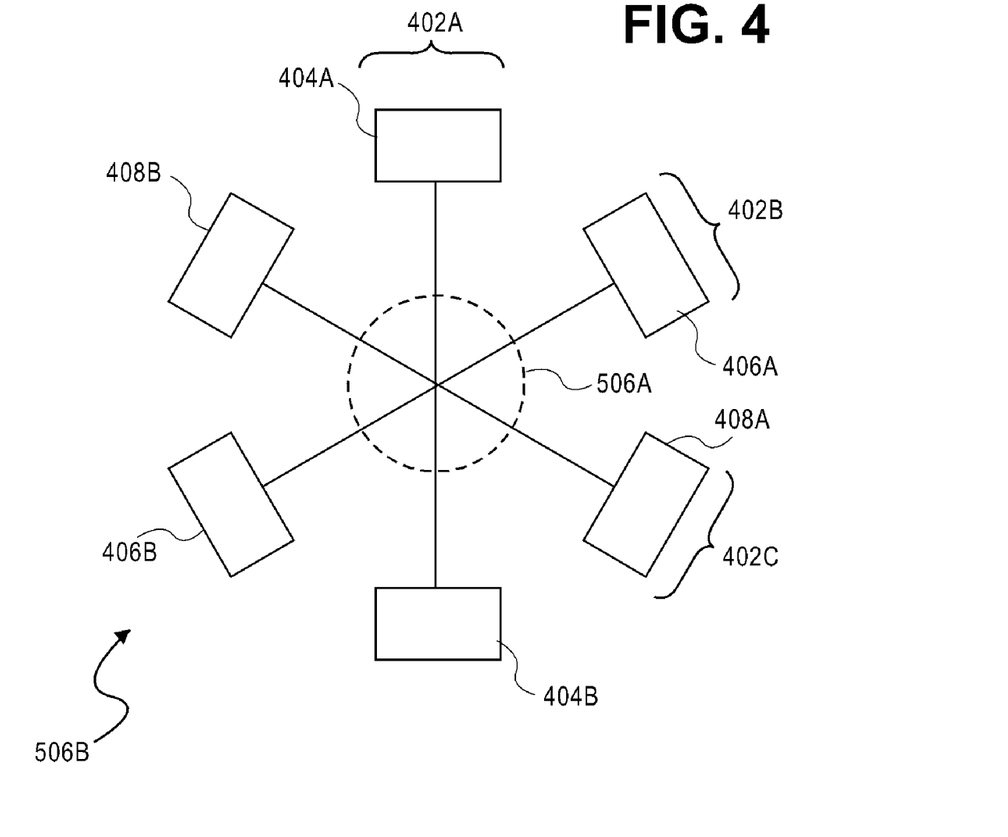
FIG. 4 is a top view diagram of a spindle motor of an optical disc device, according to an embodiment of the present disclosure.

FIG. 4 shows a portion of the spindle motor 506B in relation to the spindle rotor 506A, according to an embodiment of the present disclosure. The spindle motor 506B includes three coil groups 402A, 402B, and 402C, collectively referred to as the coil groups 402. Each of the coil groups 402 includes one or more coils. For instance, the coil group 402A includes the coils 404A and 404B, the coil group 402B includes the coils 406A and 406B, and the coil group 402C includes the coils 408A and 408B. In addition, the spindle rotor 506A contains permanently magnetized regions around the circumference of the rotor.

In general, the spindle rotor 506A and thus the optical disc 100, are rotated by consecutively applying a voltage between different pairs of the coil groups 402. Specifically, as voltages are sequentially applied to different coil group pairs over time, a rotating magnetic field is created within the coil group pairs. The spindle rotor 506A, and thus the optical disc 100, rotate due to attraction and repulsion of the spindle rotor's permanently magnetized regions with the changing coil pair magnetic fields.

Whenever voltage is applied to a pair of the coil groups 402, the remaining third coil group has a floating voltage and does not have a voltage directly applied to it. Because the voltage is applied to different coil group pairs over time, the third coil group that has the floating voltage changes over time. For instance, in a first time period a voltage may be applied between the coil groups 402A and 402B, in a second time period the voltage may be applied between the coil groups 402A and 402C, and in a third time period the voltage may be applied between the coil groups 402B and 402C. In a fourth time period the voltage may be applied between the coil groups 402B and 402A, in a fifth time period the voltage may be applied between the coil groups 402C and 402A, and in a sixth time period the voltage may be applied between the coil groups 402C and 402B. The process then starts again at the first time period. The consecutive application of the voltage between different pairs of the coil groups 402 in this way results in the rotor for the spindle rotor 506A, and thus the optical disc 100, being rotated.

A coil group switching signal is applied to the spindle motor 506B to control between which of the two coil groups 402 the voltage is to be applied. The coil group switching signal may be generated from within the spindle motor 506B, or from outside the motor 506B, such as by the controller 510. The coil group switching signal may be generated at a different location as well.

In one embodiment, the coil group switching signal may be a high-level switching signal that is a collection of a number of low-level switching signals, such as low-level pulse-width modulated switching signals that are used to control transistors or other types of switches within the spindle motor 506B, as can be appreciated by those of ordinary skill within the art. As such, the coil group switching signal can be conceptualized as is now described.

Figure 5A:
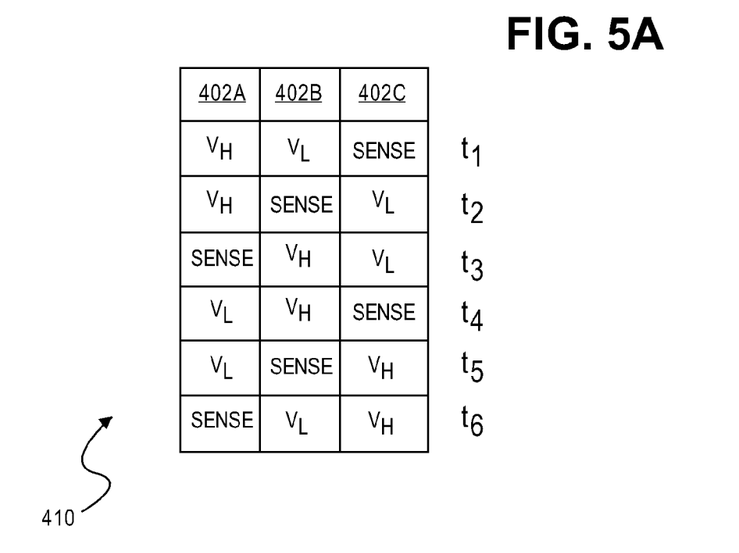
FIG. 5A is a diagram depicting how coil groups are responsive to a conceptualized coil group switching signal, according to an embodiment of the present disclosure.

FIG. 5A shows how the coil groups 402 are responsive to a conceptualized coil group switching signal 410, according to an embodiment of the present disclosure. For example, at time $t_1$, the coil group 402A is at a high voltage $V_H$ and the coil group 402B is at a low voltage $V_L$, in response to a higher-to-lower voltage being applied from the coil group 402A to the coil group 402B. As such, the coil group 402C has a floating voltage, and the back electromagnetic force, or back EMF voltage, at the coil group 402C is sensed or detected. As another example, at time $t_5$, the coil group 402C is at a high voltage $V_H$ and the coil group 402A is at a low voltage $V_L$, in response to a higher-to-lower voltage being applied from the coil group 402C to the coil group 402A. As such, the coil group 402B has a floating voltage, and the back EMF voltage at the coil group 402C is sensed or detected.

Therefore, for a repeating set of six consecutive time periods $t_1$, $t_2$, $t_3$, $t_4$, $t_5$, and $t_6$ in FIG. 5A, the higher to lower voltage is applied from the coil group 402A to the coil group 402B, then from the coil group 402A to the coil group 402C, and then from the coil group 402B to the coil group 402C. For the last three consecutive time periods, the higher to lower voltage is applied from the coil group 402B to the coil group 402A, then from the coil group 402C to the coil group 402A, and finally from the coil group 402C to the coil group 402B.

When the voltage is being applied in relation to a given coil group, the coil group in question either has a high potential or a low potential, depending on whether the voltage is applied from this coil group to another coil group (described as positive polarity), or to this coil group from another coil group (described as negative polarity). By comparison, when the voltage is not being applied in relation to a given coil group, the coil group in question has a floating potential, or voltage. However, due to the electromagnetic effects as the magnetized rotor regions rotate past the floating coil group, a separate voltage is induced into the floating coil group, otherwise known as a back EMF force or back EMF voltage. The back EMF voltage signal can be seen as either decaying in value or ramping up in value in relation to the polarity of the high and low potential currently being applied to the other coil groups.

Figure 5B:
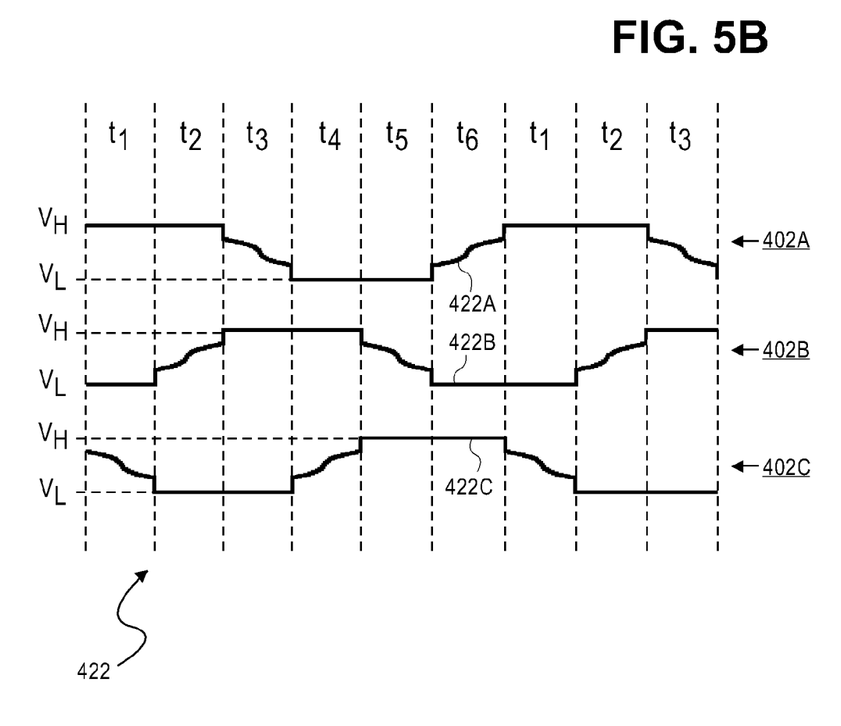
FIG. 5B is a diagram depicting representative coil group voltage waveforms for coil groups of a spindle motor of an optical disc device, according to an embodiment of the present disclosure.

Thus, the coil groups have corresponding voltage waveforms 422A, 422B, and 422C uniquely changing over time periods $t_1$, $t_2$, $t_3$, $t_4$, $t_5$, and $t_6$ as illustrated in FIG. 5B, which is referred to herein as the coil group voltage. Each coil group voltage consists of several regions varying over the time periods. For instance, if the high potential voltage or low potential voltage is currently being applied to a given coil group, then the coil group voltage waveform will be at a constant high voltage, $V_H$ or at a constant low voltage $V_L$, depending on the polarity of the voltage being applied between this coil group and another coil group. If no voltage is being applied in relation to a given coil group, then the coil group voltage waveform will be at a floating potential or raw back EMF voltage, ramping up or decaying down as has been described.

FIG. 5B therefore shows representative coil group voltage waveforms 422A, 422B, and 422C, collectively referred to as the coil group voltage waveforms 422, according to an embodiment of the present disclosure. The voltage waveforms 422 are for the coil groups 402. The time periods $t_n$, where n is a value between one and six, correspond to the same time periods indicated in FIG. 5A. The coil group voltage waveforms have voltages ranging from a high voltage $V_H$ to a low voltage $V_L$, which may be zero in one embodiment.

Within the time period $t_1$, therefore, the coil group voltage waveform 422A for the coil group 402A is at a high voltage and the coil group voltage waveform 422B for the coil group 402B is at a low voltage. The coil group voltage waveform 422C for the coil group 402C is at a floating voltage and shows the raw back EMF signal that is decaying. Within the time period $t_2$, the coil group voltage waveform 422A is still at a high voltage, while the coil group voltage waveform 422C is at a low voltage. The coil group voltage waveform 422B is at a floating voltage and shows the raw back EMF signal that is ramping up. Within the time period $t_3$, the coil group voltage waveform 422B is at a high voltage, while the coil group voltage waveform 422C is still at a low voltage. The coil group voltage waveform 422A is at a floating voltage and shows the raw back EMF signal that is decaying.

Within the time period $t_4$, the coil group voltage waveform 422B is still at a high voltage, while the coil group voltage waveform 422A is at a low voltage, and the coil group voltage waveform 422C is at a floating voltage and shows the raw back EMF signal that is ramping up. Within the time period $t_5$, the coil group voltage waveform 422C is at a high voltage, while the coil group voltage waveform 402A is still at a low voltage, and the coil group voltage waveform 422B is at a floating voltage and shows the raw back EMF signal that is ramping down. Within the time period $t_6$, the coil group voltage waveform 422C is still at a high voltage, while the coil group voltage waveform 402B is at a low voltage, and the coil group voltage waveform 422A is at a floating voltage and shows the raw back EMF signal that is ramping up.

It is noted that in actuality, the voltages reflected by coil group voltage waveforms 422 are not constant, but rather are modulated in accordance with a pulse-width modulation (PWM) control signal. That is, when a voltage is applied between two of the coil groups 402, the voltage is modulated in accordance with such a PWM control signal. A PWM control signal can be considered a square-wave signal in which a pulse is modulated. The PWM control signal may be generated from within the spindle motor 506B, or from outside the motor 506B, such as by the controller 510. The PWM control signal may be generated at a different location as well.

Figure 5C:
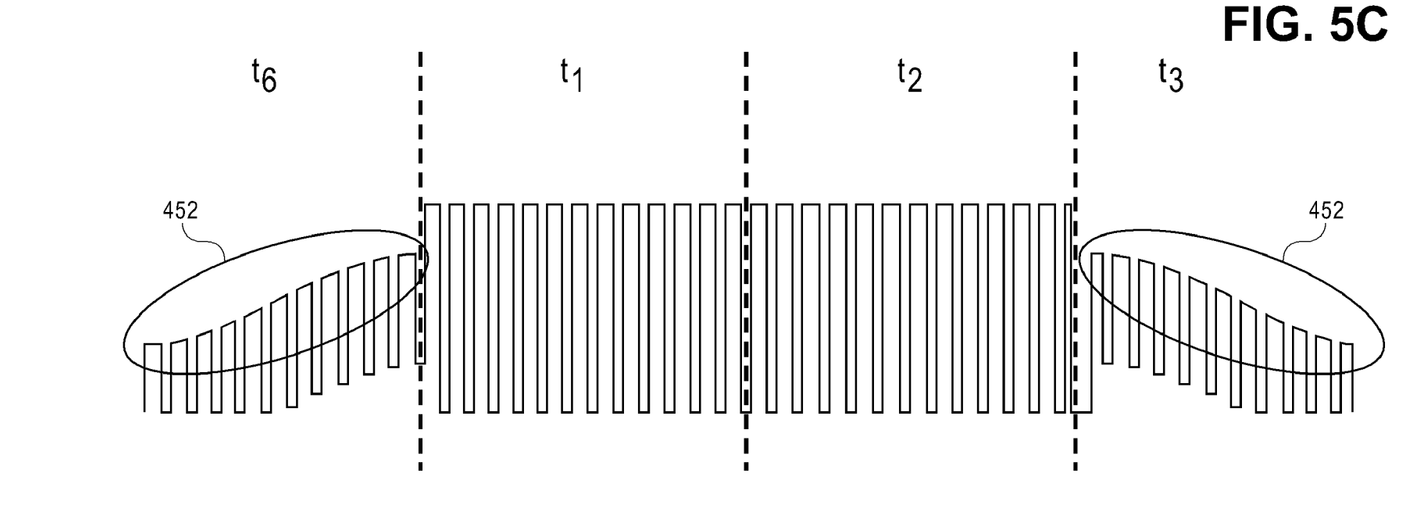
FIG. 5C is a diagram depicting in more detail a coil group voltage waveform for a coil group of a spindle motor of an optical disc device, according to an embodiment of the present disclosure.

FIG. 5C shows a portion of the coil group voltage waveform 422A of FIG. 5B in more detail, according to an embodiment of the present disclosure. In particular, the coil group voltage waveform 422A is depicted over time periods $t_6$, $t_1$, $t_2$, and $t_3$ in FIG. 5C. The pulse modulation of the coil group voltage waveform 422A in actuality is evident in FIG. 5C. Thus, the effects of applying the voltages between two of the coil groups 402, as modulated in accordance with the PWM control signal, are depicted in FIG. 5C. The modulation of the coil group voltage waveforms 422 in FIG. 5B by comparison is not depicted for illustrative clarity and convenience.

Embodiments of the present disclosure generate the virtual spoke signals that have been described based on the raw back EMF signal segments of the coil group voltage waveforms 422, based on the coil group switching signal 410, and based on the PWM control signal that have been described. In this way, the optical disc 100 can be positionally controlled based on the virtual spoke signals, even where the optical disc rotates at no more than 600 RPM, for instance. As such, physical spokes that otherwise would have to be present on the optical disc 100 to positionally control the optical disc at these low speeds do not have to be present. One approach for generating the virtual spoke signals based on the raw back EMF signal segments of the coil group voltage waveforms, the coil group switching signal 410, and the PWM control signal is now described.

Figure 6:
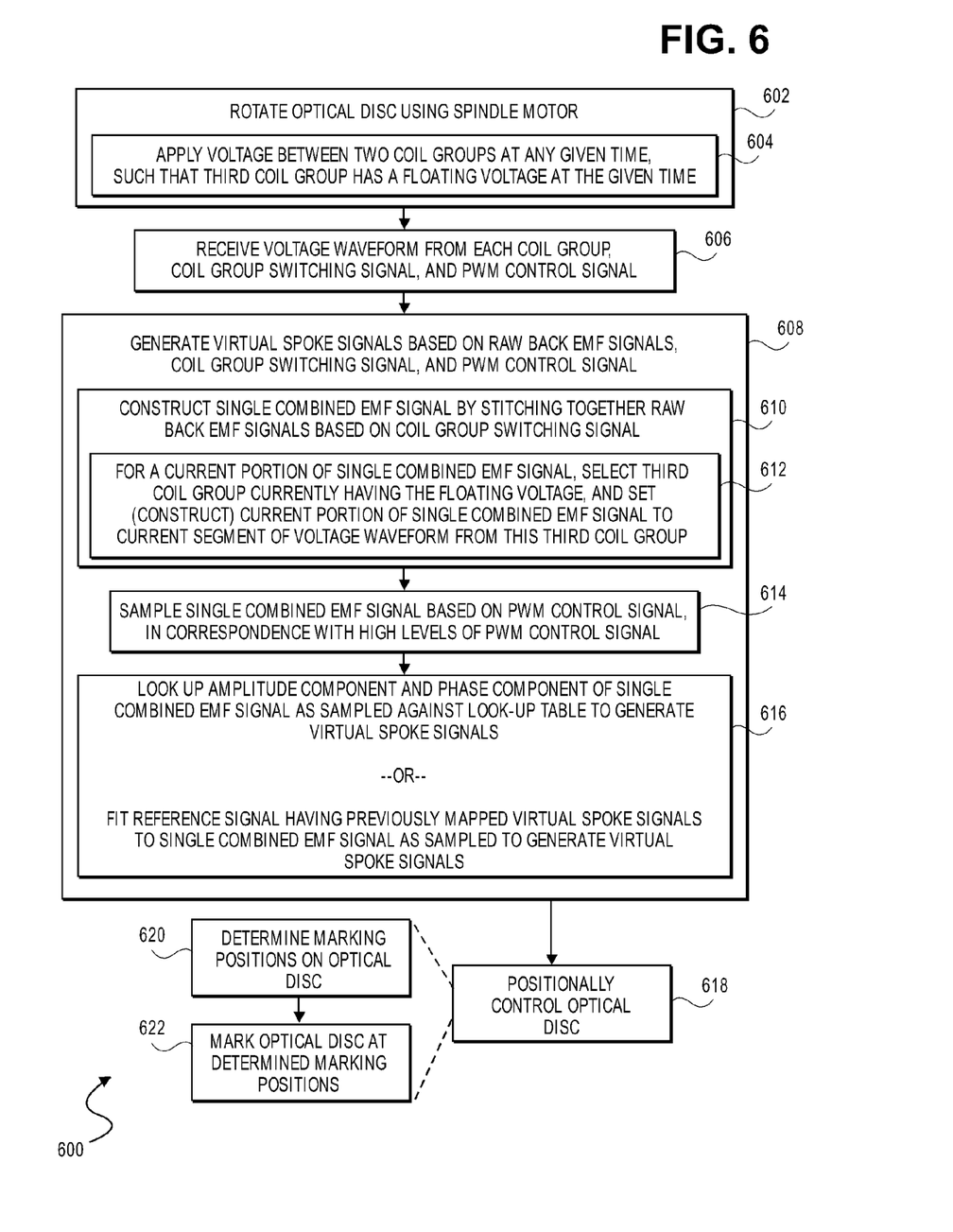
FIG. 6 is a flowchart of a method for positionally controlling an optical disc at low speeds, according to an embodiment of the disclosure.

FIG. 6 shows a method 600 for positionally controlling the optical disc 100 at low speed—such that it rotates at no more than 600 RPM—by using generated virtual spoke signals, according to an embodiment of the present disclosure. The method 600 may be implemented as one or more computer programs stored on a computer-readable medium, and which may be executed by a processor or other computing component of the optical disc device 500 or another type of computing device. The method 600 thus may be performed by the controller 510 of the optical disc device 500 in one embodiment.

The optical disc 100 is rotated at low speed (602), such as at no more than 600 RPM. The optical disc 100 may be rotated at such low speed so that the optical mechanism 502 can optically write a human-readable or other image to the optically writable label surface 106 of the optical disc 100. The optical disc 100 is rotated by the controller 510 appropriately controlling the spindle motor 506B to which the spindle rotor 506A is connected, where the optical disc 100 has been placed on the spindle rotor 506A.

In one embodiment, the optical disc 100 is rotated at low speed by applying a voltage between two coil groups at any given time (604), such that the third coil group has a floating voltage at the given time, as has been described. For instance, the voltage may be applied in response to the coil group switching signal 410, which indicates for each given time period the two coil groups between which the voltage is to be applied, and which remaining third coil group is to have a floating voltage. The voltage is applied in correspondence with a PWM control signal, as has been described in relation to FIG. 5C.

The coil group voltage waveforms 422 from the coil groups 402, the coil group switching signal 410, and the PWM control signal are all received (606). Based on the raw back EMF signals represented within the coil group voltage waveforms 422, as well as the group switching signal 410 and the PWM control signal, virtual spoke signals are generated (608). In one embodiment, this is achieved as follows. A single combined EMF signal is constructed by effectively stitching together different segments, or segments, of the coil group voltage waveforms representing the individual coil group raw back EMF signals, based on the coil group switching signal 410 (610). For instance, for a given current time period as shown on the coil group voltage waveforms 422, two coil groups will have high and low voltage potentials applied. The third coil group that currently has the floating voltage is selected, and the current portion of the combined back EMF signal is set equal to (i.e., is constructed as) the current segment of the coil group voltage waveform from this third coil group (612), which represents the raw back EMF signal of this coil group.

Figure 7A:
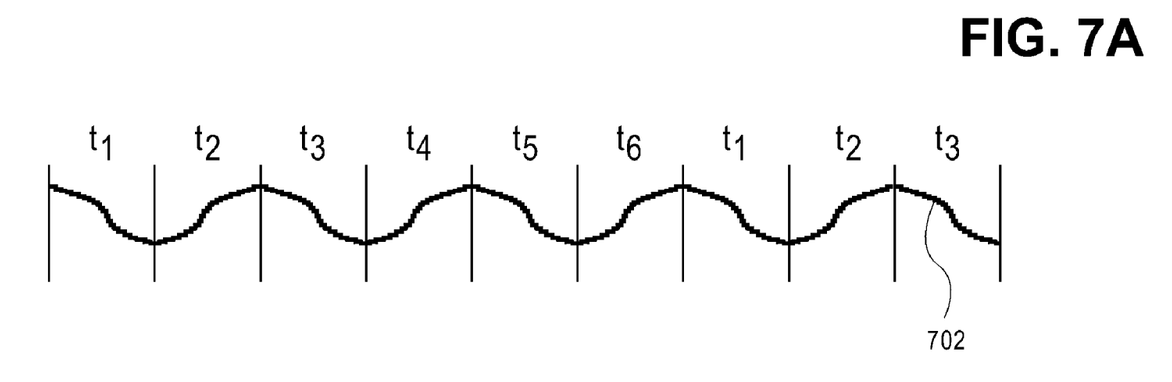
FIGS. 7A and 7B are diagrams of a representative combined back EMF signal that may be constructed for raw back EMF signals received from different coil groups of a spindle motor of an optical disc device, according to an embodiment of the disclosure.

FIG. 7A shows a representative combined back EMF signal 702, according to an embodiment of the disclosure. The portion of the combined back EMF signal 702 for the time period $t_1$ is set equal to the raw back EMF signal represented by the coil group voltage waveform 422C of FIG. 5B in the time period $t_1$, because in the time period $t_1$ the corresponding coil group 402C does not have a voltage applied in relation thereto. The portion of the combined back EMF signal 702 for the time period $t_2$ is set equal to the raw back EMF signal represented by the coil group voltage waveform 422B of FIG. 5B in the time period $t_2$, because in the time period $t_2$ the corresponding coil group 402B does not have a voltage applied in relation thereto. The portion of the combined back EMF signal 702 for the time period $t_3$ is set equal to the coil group voltage waveform represented by the coil group voltage waveform 422A of FIG. 5B in the time period $t_3$, because in the time period $t_3$ the corresponding coil group 402A does not have a voltage applied in relation thereto. Similarly, the portions of the combined back EMF signal 702 for the time periods $t_4$, $t_5$, and $t_6$ are set equal to the raw back EMF signals represented within the coil group voltage waveforms 422C, 422B, and 422A in the time periods $t_4$, $t_5$, and $t_6$, respectively.

Figure 7B:
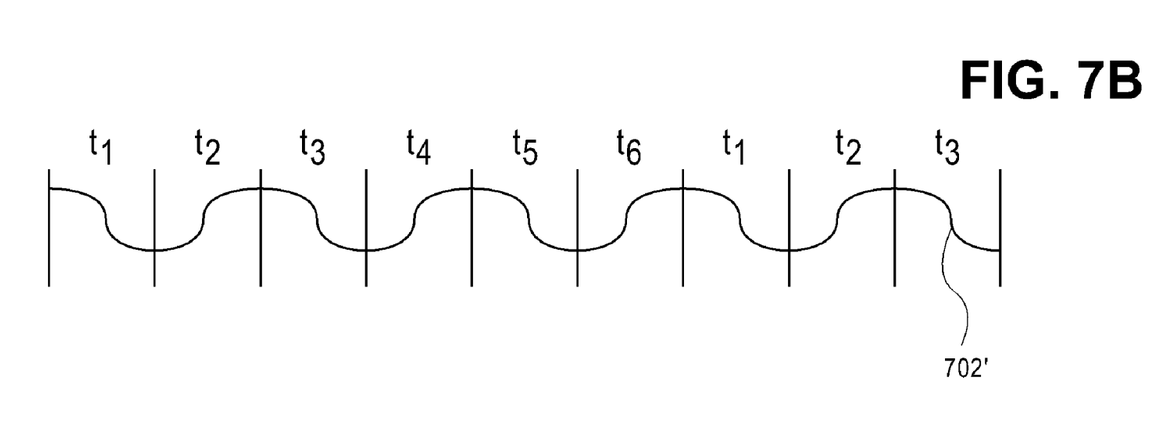

Thus, to construct the combined EMF signal 702, the coil group switching signal 410 is employed to determine which of the raw back EMF portions of the coil group voltage waveforms 422 should be copied, as to the current time period, to yield a corresponding portion of the combined EMF signal 702. The decaying and the ramping up portions of the raw back EMF signals represented by the coil group voltage waveforms 422 when stitched together to yield the combined EMF signal 702 in this way results in a signal that is substantially a sine wave. Further processing of the single combined EMF signal 702 can be achieved, such as passing the signal 702 through one or more filters, so that the signal 702. FIG. 7B, for instance, shows the result of processing the single combined EMF signal 702 to yield the single combined EMF signal 702', according to an embodiment of the present disclosure.

Referring back to FIG. 6, the combined EMF signal 702 is sampled based on the PWM control signal (614). In particular, the combined EMF signal 702 is sampled in correspondence with high levels of the PWM control signal. It can be said that such sampling occurs in conjunction with and/or simultaneously with the construction of the combined EMF signal 702 in part 612. However, parts 612 and 614 are broken into separate steps, parts, or acts in the method 600 for illustrative clarity.

For instance, referring to FIG. 5C, the raw back EMF signal portions of the coil group voltage waveform 422A are sampled in time periods $t_6$ and $t_3$ as indicated by the circled areas 452, at the high levels of the coil group voltage waveform 422A as pulse-width modulated by the PWM control signal. The resulting samples are thus taken at points corresponding to the darkened top parts of the pulses of the raw back EMF signal portions of the coil group voltage waveform 422 within the circled areas 452. In this way, the combined EMF signal 702 is said to be sampled in correspondence with the high levels of the PWM control signal, in that the portions of the raw back EMF signals represented by the coil group voltage waveforms 422 that are copied to yield the combined EMF signal 702 are the top-most parts of the pulses within the portions in question of the raw back EMF signal portions of the coil group voltage waveforms 422.

The virtual spoke signals are then generated from the combined EMF signal 702 that has been constructed, such as in one of two different ways (616). As has been noted, the virtual spoke signals correspond to actual, physical encoder spokes that would otherwise have to be present on the optical disc 100 for the optical disc 100 to be positionally controlled as the disc 100 rotates at low speed. Thus, the encoder spokes do not have to be present on the optical disc 100.

Figure 8:
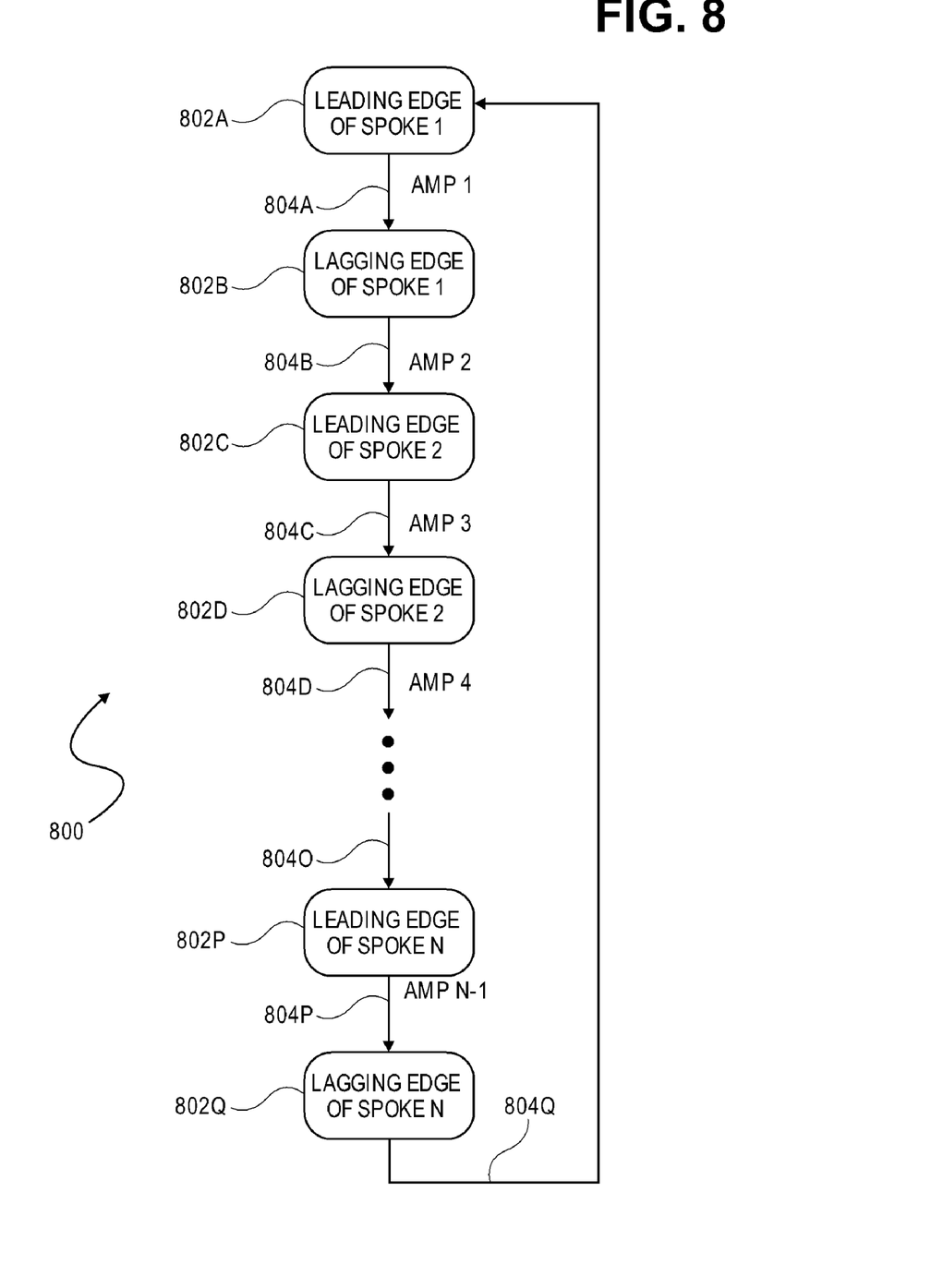
FIG. 8 is a diagram of a state sequence data structure that can be employed to generate virtual spoke signals on the basis of a constructed single combined EMF signal, according to an embodiment of the present disclosure.

First, in one embodiment, a state sequence data structure can be used to generate the virtual spoke signals based on the combined EMF signal 702. FIG. 8 shows such a state sequence data structure 800 that can be used to generate the virtual spoke signals based on the combined EMF signal 702, according to an embodiment of the present disclosure. There are a number of states 802A, 802B, 802C, 802D, . . . , 802P, 802Q, collectively referred to as the states 802, and which correspond to the leading and lagging edges a number of virtual spokes N. There are state transitions 804A, 804B, 804C, . . . , 804O, 804P, 804Q, collectively referred to as the state transitions 804, and which control when a given state transitions to a new state. The number of states 802 in one embodiment can be equal to twice the number of virtual spokes N. Likewise, the number of state transitions 804 is equal to twice the number of virtual spokes N.

For example, starting at the state 802A, the leading edge of a virtual spoke is triggered. When the amplitude of the combined EMF signal 702 is equal to the amplitude corresponding to the transition 804A, the state 802A transitions to the state 802B, and the lagging edge of this virtual spoke is triggered. As another example, when the amplitude of the combined EMF signal 702 is equal to the amplitude corresponding to the transition 804B, the state 802B transitions to the state 802C, and the leading edge of another virtual spoke is triggered. When the amplitude of the combined EMF signal 702 is equal to the amplitude corresponding to the transition 804C, the state 802C transitions to the state 802D, and the lagging edge of this virtual spoke is triggered. This process continues until at the state 802N, when the combined EMF signal 702 is equal to the amplitude corresponding to the transition 804N, the state 802N transitions back to the state 802A.

The sequence of the states 802 can be considered in one embodiment as corresponding to one full revolution of the rotor 506A. That is, in this embodiment, one full revolution of the rotor 506A results in traversal through all the states 802 depicted in FIG. 8, where the number of the states 802 in this embodiment is equal to twice the number of virtual spokes to be triggered, such as 400, over the traversal of each entire time period range of $t_1$ through $t_6$. In other embodiments, the sequence of the states 802 may not correspond to one full revolution of the rotor 506A, but rather may correspond to more than one full revolution or less than one full revolution.

In one embodiment, however, the entire range of the stator time periods $t_1$ through $t_6$ of the stator may have to make many revolutions to correspondingly make a single rotor revolution. That is, stator revolutions may not have a one-to-one correspondence with rotor revolutions; rather, there may be a many-to-one correspondence between stator revolutions and rotor revolutions. Furthermore, in one embodiment, the number of stator revolutions for a given rotor revolution may not be an integral number. In either case, therefore, in one embodiment the number of states 802 may be more than twice the number of spokes to be triggered. For instance, if the number of statutory revolutions for a given rotor revolution is X, where X may or may not be an integer, then the number of states 802 may be equal to 2PX, where P is the number of spokes to be triggered, such as 400. In another embodiment, however, the number of states is fixed at 2P, but the amplitudes corresponding to the state transitions 804 and/or the time periods $t_1$ through $t_6$ may change for each traversal through all the states 800.

Second, in another embodiment, the virtual spoke signals may be generated by fitting a reference signal to the combined EMF signal 702. The reference signal has previously or a priori mapped thereto the desired number of virtual spokes (i.e., the virtual spoke signals). The reference signal is expanded or contracted to correspond to the combined EMF signal 702. Based on this fitting or the matching of the reference signal to the combined EMF signal 702, the virtual spoke signals can be generated based on where the virtual spokes are located in relation to the reference signal, where these virtual spokes expand and contract in their location along with the reference signal itself. In this way, the virtual spoke signals can be generated from the combined EMF signal 702.

Figure 9A:
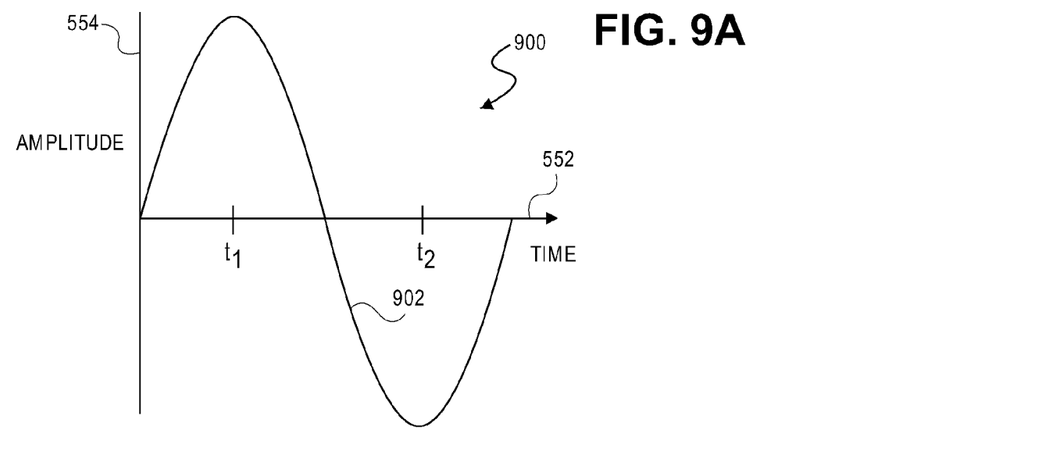
FIGS. 9A, 9B, and 9C are diagrams exemplarily depicting how a reference signal having virtual spokes a priori mapped thereon can be employed in relation to a constructed single combined EMF signal to generate virtual spoke signals, according to an embodiment of the present disclosure.
Figure 9B:
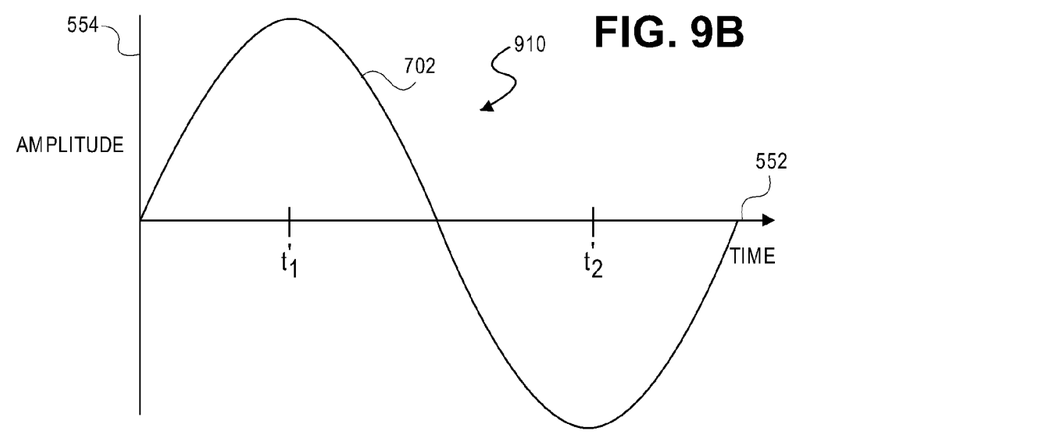
Figure 9C:
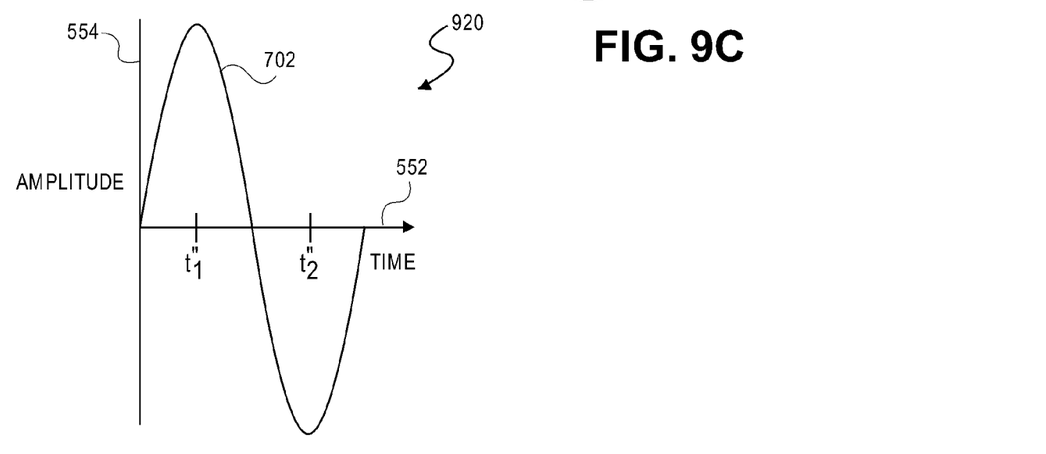

FIGS. 9A, 9B, and 9C exemplarily illustrate how a reference signal can be fitted to the combined EMF signal 702 to generate the virtual spoke signals, according to an embodiment of the present disclosure. In FIG. 9A, a plot 900 of a reference signal 902 is depicted against the x-axis 552 denoting time and the y-axis 554 denoting amplitude. It is a priori determined or otherwise known that the virtual spokes occur at various times along the period of the reference signal 902, where FIG. 9A shows one such period of the signal 902. For example purposes, two virtual spoke trigger points are indicated in FIG. 9A, at times $t_1$ and $t_2$. Thus, at time $t_1$ a given virtual spoke number is generated, and at time $t_2$ a different virtual spoke number is generated.

In FIG. 9B, an example plot 910 of the combined EMF signal 702 is depicted against the x-axis 552 denoting time and the y-axis 554 denoting amplitude. The combined EMF signal 702 is depicted in FIG. 9B such that the optical disc 100 is being rotated more slowly than the reference signal 900 indicates in FIG. 9A. Therefore, the reference signal 900 is fitted to the combined EMF signal 702. In FIG. 9B, this means that the reference signal 900 is effectively expanded, or stretched, so that the reference signal 900 coincides with and overlaps the combined EMF signal 702. The locations at which the virtual spokes are triggered in the reference signal 900 are correspondingly stretched or expanded proportionally. Thus, rather than the given virtual spoke number being generated at time $t_1$ as in FIG. 9A, it is generated at time $t_1'$, where $t_1'$ occurs after $t_1$. Likewise, rather than the other given virtual spoke number being generated at time $t_2$ as in FIG. 9A, it is generated at time $t_2'$, where $t_2'$ occurs after $t_2$.

In FIG. 9C, another example plot 920 of the combined EMF signal 702 is depicted against the x-axis 552 denoting time and the y-axis 554 denoting amplitude. The actual combined EMF signal 702 is depicted in FIG. 9C such that the optical disc 100 is being rotated more quickly than the reference signal 900 indicates in FIG. 9A. Therefore, the reference signal 900 is again fitted to the combined EMF signal 702. In FIG. 9C, this means that the reference signal 900 is effectively compressed, or contracted, so that the reference signal 900 coincides with and overlaps the combined EMF signal 702. The locations at which the virtual spokes are triggered in the reference signal 900 are correspondingly compressed or contracted proportionally. Thus, rather than the given virtual spoke number being generated at time $t_1$ as in FIG. 9A, it is generated at time $t_1''$, where $t_1''$ occurs before $t_1$. Likewise, rather than the other given virtual spoke number being generated at time $t_2$ in FIG. 9A, it is generated at time $t_2''$, where $t_2''$ occurs before $t_2$.

Referring back to FIG. 6, once the virtual spoke signals have been generated in part 608, the controller 510 is able to positionally control the optical disc 100 based on these virtual spoke signals (618). Such positional control of the optical disc 100 can be achieved in the same way that it is achieved when actual, physical spokes formed on the optical disc 100 are detected, as can be appreciated by those of ordinary skill within the art. Thus, at least some embodiments can be considered as "drop in" replacements within methodologies that positionally controlled optical discs on the basis of detecting actual, physical spokes on the optical discs.

That is, rather than having to detect such encoder spokes, such methodologies can now use the virtual spoke signals that are inventively generated as has been described. As such, encoders and other components that had been included within optical disc devices solely for the purpose of detecting actual, physical encoder spokes no longer need to be included, and encoder spokes that had been formed on the optical discs no longer need to be added to the optical discs. In both of these ways, embodiments of the present disclosure provide for cost savings over the prior art.

It is noted that the method 600 may include other parts, in addition to and/or in lieu of those particularly depicted in FIG. 6. For example, as the optical disc 100 is being positionally controlled on the basis of the virtual spoke signals that have been generated, the optical mechanism 502 may be employed to optically write a desired image to the optically writable label surface 106 of the optical disc 100. The optical disc 100 thus may be positionally controlled at the low speeds that may be needed for such optical writing to the label surface 504 to occur.

As another example, in one embodiment the positional controlling of the optical disc in part 618 can be encompassed by two additional steps, acts, or parts of the method 600. The first such part can be using the back EMF signal to determine marking positions on the optical disc (620). The second such part can be using the back EMF signal to mark the optical disc at the determined marking positions (622). By determining the marking positions on the optical disc using the back EMF signal, and then actually marking the optical disc at these marking positions, a desired human-readable image can be thus formed on the optically writable label surface of an optical disc.

We claim:

1. A method comprising:
   rotating an optical disc at no more than 600 revolutions per minute (RPM) using a spindle motor of an optical disc device, the spindle motor having at least three coil groups, each coil group having one or more coils,
      where while the optical disc is rotating, at least one of the coil groups generates a back electromagnetic force (EMF) signal;
   generating virtual spoke signals based on the back EMF signal, a pulse-width modulation (PWM) control signal, and a coil group switching signal; and
   positionally controlling the optical disc based on the generated virtual spoke signals, wherein the generated virtual spoke signals enable marking the optical disc and wherein positionally controlling the optical disc further comprises:
      using the back EMF signal to determine marking positions on the optical disc; and using an optical beam to mark the optical disc at the determined marking positions.

2. The method of claim 1, wherein the optical disc is rotated by applying a voltage between two coil groups of the three coil groups at a given time such that a third coil group of the three coil groups has a floating voltage at the given time, the voltage being applied in response to the coil group switching signal indicating the two coil groups between which the voltage is to be applied, and the voltage being applied in correspondence with the pulse-width modulation (PWM) control signal, where the voltage is sequentially applied between two different coil groups of the three coil groups over time such that the third coil group having the floating voltage changes over time,
  wherein the method further comprises:
  receiving a coil group voltage waveform from each coil group, receiving the coil group switching signal, and receiving the PWM control signal, where the coil group voltage waveform for the third coil group that has the floating voltage at the given time represents a raw back EMF signal; and
  wherein the virtual spoke signals correspond to actual, physical spokes that otherwise have to be present on the optical disc to positionally control the optical disc as the optical disc rotates at no more than 600 RPM.

3. The method of claim 2, wherein generating the plurality of the virtual spoke signals comprises:
  constructing a single combined EMF signal by stitching together the raw back EMF signals represented by the coil group voltage waveforms of the coil groups based on the coil group switching signal; and,
  sampling the single combined EMF signal constructed based on the PWM control signal.

4. The method of claim 3, wherein constructing the single combined EMF signal comprises, for a current portion of the single combined EMF signal:
  selecting the third coil group currently having the floating voltage as one of the three coil groups that does not have the voltage applied therebetween as indicated by the coil group switching signal; and,
  constructing the current portion of the single combined EMF signal as a current portion of the raw back EMF signal represented by the coil group voltage waveform from the third coil group selected.

5. The method of claim 4, wherein sampling the single combined EMF signal comprises sampling the current portion of the single combined EMF signal in correspondence with high levels of the PWM control signal.

6. The method of claim 3, wherein generating the plurality of the virtual spoke signals further comprises using a state sequence data structure having a plurality of states corresponding to the virtual spoke signals.

7. The method of claim 3, wherein generating the plurality of the virtual spoke signals further comprises fitting a reference signal having the virtual spoke signals previously mapped thereto to the single combined EMF signal as sampled, such that the virtual spoke signals are generated based on the single combined EMF signal as sampled and as to which the reference signal has been fitted thereto.

8. The method of claim 2, wherein generating the virtual spoke signals eliminates a need for the actual, physical spokes being present on the optical disc, wherein the optical disc comprises a plurality of physical spokes.

9. The method of claim 2, wherein generating the virtual spoke signals based on the coil group voltage waveform from each coil group including the raw back EMF signal from the third coil group that has the floating voltage at the given time, based on the coil group switching signal, and based on the PWM control signal eliminates a need for the optical disc device to include an encoder to detect actual, physical spokes on the optical disc.

10. An optical disc device comprising:
  a spindle motor to rotate an optical disc at least at speeds no more than 600 revolutions per minute (RPM), the spindle motor having at least three coil groups, each coil group comprising one or more coils, each coil group generating a coil group voltage waveform,
    where the optical disc is rotated by application of a voltage between two coil groups of the three coil groups at a given time such that a third coil group of the three coil groups has a floating voltage at the given time, the voltage being applied in response to a coil group switching signal indicating the two coil groups between which the voltage is to be applied, and the voltage being applied in correspondence with a pulse-width modulation (PWM) control signal,
    where the voltage is sequentially applied between two different coil groups of the three coil groups over time such that the third coil group having the floating voltage changes over time, the coil group voltage waveform for the third coil group that has the floating voltage representing a raw back electromagnetic force (EMF) signal;
  an optical mechanism to form an image on an optically writable label surface of an optical disc as the optical disc rotates at no more than 600 RPM; and,
  a controller to positionally control the optical disc as the optical disc rotates at no more than 600 RPM to permit the optical mechanism to form the image on the optically writable label surface of the optical disc,
  wherein the controller positionally controls the optical disc based on a plurality of virtual spoke signals, the controller generating the virtual spoke signals based on the raw back EMF signal from the third coil group that has the floating voltage at the given time, based on the coil group switching signal, and based on the PWM control signal.

11. The optical disc device of claim 10, wherein the controller is to generate the plurality of the virtual spoke signals by:
  constructing a single combined EMF signal by stitching together the raw back EMF signals from the coil groups represented by the coil group voltage waveforms of the coil groups based on the coil group switching signal; and,
  sampling the single combined EMF signal constructed based on the PWM control signal.

12. The optical disc device of claim 11, wherein the controller is to construct the single combined EMF signal by, for a current portion of the single combined EMF signal:
  selecting the third coil group currently having the floating voltage as one of the three coil groups that does not have the voltage applied therebetween as indicated by the coil group switching signal; and,
  constructing the current portion of the single combined EMF signal as a current portion of the raw back EMF signal represented by the coil group voltage waveform from the third coil group selected.

13. The optical disc device of claim 12, wherein the controller is to sample the single combined EMF signal comprises by sampling the current portion of the single combined EMF signal in correspondence with high levels of the PWM control signal.

14. The optical disc device of claim 11, wherein the controller is to generate the plurality of the virtual spoke signals by further fitting a reference signal having the virtual spoke signals previously mapped thereto to the single combined EMF signal as sampled, such that the virtual spoke signals are generated based on the single combined EMF signal as sampled and as to which the reference signal has been fitted thereto.

15. A non-transitory, tangible computer-readable medium having embedded therein instructions executable by a processor, the instructions to:

rotate an optical disc at no more than 600 revolutions per minute (RPM) using a spindle motor of an optical disc device, the spindle motor having three coil groups, each coil group having one or more coils, where the optical disc is rotated by applying a voltage between two coil groups of the three coil groups at a given time such that a third coil group of the three coil groups has a floating voltage at the given time, the voltage being applied in response to a coil group switching signal indicating the two coil groups between which the voltage is to be applied, and the voltage being applied in correspondence with a pulse-width modulation (PWM) control signal, where the voltage is sequentially applied between two different coil groups of the three coil groups over time such that the third coil group having the floating voltage changes over time;

receive a coil group voltage waveform from each coil group, receive the coil group switching signal, and receive the PWM control signal, where the coil group voltage waveform for the third coil group that has the floating voltage at the given time represents a raw back electromagnetic force (EMF) signal;

generate a plurality of virtual spoke signals based on the raw back EMF signal from the third coil group that has the floating voltage at the given time, based on the coil group switching signal, and based on the PWM control signal; and, positionally control the optical disc based on the virtual spoke signals generated, as the optical disc rotates at no more than 600 RPM.

* * * * *